United States Patent
Wang et al.

(10) Patent No.: US 12,143,517 B2
(45) Date of Patent: Nov. 12, 2024

(54) CHALLENGE SCREENING METHOD FOR IMPROVING STABILITY OF STRONG PHYSICAL UNCLONABLE FUNCTION

(71) Applicant: Wenzhou University, Zhejiang (CN)

(72) Inventors: Pengjun Wang, Zhejiang (CN); Ziyu Zhou, Zhejiang (CN); Hao Ye, Zhejiang (CN); Yijian Shi, Zhejiang (CN)

(73) Assignee: Wenzhou University, Zhejiang (CN)

( * ) Notice: Subject to any disclaimer, the term of this patent is extended or adjusted under 35 U.S.C. 154(b) by 133 days.

(21) Appl. No.: 18/180,812

(22) Filed: Mar. 8, 2023

(65) Prior Publication Data

US 2024/0171412 A1    May 23, 2024

(30) Foreign Application Priority Data

Nov. 22, 2022  (CN) .......................... 202211464057.8

(51) Int. Cl.
*H04L 9/32*        (2006.01)
(52) U.S. Cl.
CPC .................................. *H04L 9/3278* (2013.01)
(58) Field of Classification Search
CPC ....................................................... H04L 9/3278
See application file for complete search history.

(56) References Cited

U.S. PATENT DOCUMENTS

| | | | | |
|---|---|---|---|---|
| 11,211,140 | B1* | 12/2021 | Satpathy | G06F 21/31 |
| 2017/0077046 | A1* | 3/2017 | Gupta | H03K 19/21 |
| 2018/0337791 | A1* | 11/2018 | Ammo | H04L 9/3278 |
| 2018/0337793 | A1* | 11/2018 | Park | G11C 16/28 |
| 2019/0221254 | A1* | 7/2019 | Liu | H04L 9/3278 |
| 2020/0014547 | A1* | 1/2020 | Lu | G11C 11/417 |
| 2020/0044871 | A1* | 2/2020 | Lu | G11C 11/419 |
| 2020/0044872 | A1* | 2/2020 | Willsch | H04L 9/3278 |
| 2020/0342112 | A1* | 10/2020 | Plusquellic | G06F 21/602 |
| 2020/0396090 | A1* | 12/2020 | Bellon | G06F 21/72 |
| 2021/0110067 | A1* | 4/2021 | Suresh | G06F 21/31 |
| 2021/0175185 | A1* | 6/2021 | Kozicki | H04L 9/0866 |
| 2021/0326490 | A1* | 10/2021 | Zalivaka | G06F 11/1068 |
| 2021/0336804 | A1* | 10/2021 | Parhi | G06F 21/73 |
| 2021/0351943 | A1* | 11/2021 | Abbott | H04L 9/3278 |
| 2024/0171412 | A1* | 5/2024 | Wang | H04L 9/3278 |

\* cited by examiner

*Primary Examiner* — Gary S Gracia
(74) *Attorney, Agent, or Firm* — JCIPRNET

(57) ABSTRACT

The invention discloses a challenge screening method for improving the stability of a strong Physical Unclonable Function (PUF). If the stability of the group of challenges (GOCs) is quantized by 1 or 0, the GOCs are defined as stable challenges or unstable challenges respectively; the GOCs and the stability of corresponding responses are defined as a challenge-stability pair (CSP); a machining learning training dataset is constructed through CSPs for obtaining a screening model, to associate the challenge stability with the screening model; during actual application of the strong PUF, the challenge stability of a strong PUF is determined through the screening model, and stable challenges of the strong PUF are screened out to form a stable challenge set, which is input into the strong PUF to extract identity information. The challenge screening method can effectively improve the stability of various strong PUFs and has better effect with external disturbance increasing.

3 Claims, 4 Drawing Sheets

CHALLENGE SCREENING METHOD FOR IMPROVING STABILITY OF STRONG PHYSICAL UNCLONABLE FUNCTION

CROSS-REFERENCE TO RELATED APPLICATION

This application claims the priority benefit of China application serial no. 202211464057.8, filed on Nov. 22, 2022. The entirety of the above-mentioned patent application is hereby incorporated by reference herein and made a part of this specification.

TECHNICAL FIELD

The invention relates to a screening method, in particular to a challenge screening method for improving the stability of a strong Physical Unclonable Function.

DESCRIPTION OF RELATED ART

With the development of Internet of Things (IoT), the sensing of everything and interconnection of everything have become the mainstream development trends of all fields in production and life, which is accompanied by various hardware and software attacks on IoT equipment. Physical unclonable functions (Physical Unclonable Functions) which extract unique identifiers using physical differences of circuits can be widely applied to the fields such as equipment authentication and key generation, and have a broad application prospect in solving various IoT security problems because of their light-weight, non-storage and non-volatile properties. Inputs of the Physical Unclonable Functions are called challenges, outputs of the Physical Unclonable Functions are called responses, every time a group of challenges is input to the Physical Unclonable Functions, corresponding responses will be output, and the group of challenges and the corresponding responses constitute a challenge response pair (CRP). According to the capacity to generate CRPs, Physical Unclonable Functions are divided into strong Physical Unclonable Functions and weak Physical Unclonable Functions. The number of CRPs of strong Physical Unclonable Functions increases exponentially with the expansion of the structure, so the strong Physical Unclonable Functions are more suitable for equipment authentication. Because of the huge number of CPRs of the strong Physical Unclonable Functions, it is impossible to test the stability of all challenge response pairs in a short time. Unstable bits will cause serious hidden dangers in high-accuracy and time-sensitive applications such as intelligent healthcare and unmanned driving.

Due to the fact that the equipment authentication protocol based on strong Physical Unclonable Functions typically comprises a register phase and an authentication phase, ID information of equipment may be directly provided by CRPs or by a Physical Unclonable Function model. Under the influence of environmental noise, transmission errors and other factors during the authentication process, it is hard to realize 100% matching of information. So, a threshold c is set in the protocol; when the matching degree is over, the authentication is considered as successful. During the authentication process, if one group of challenges is randomly selected for authentication, responses generated corresponding to unstable challenges will reduce the matching degree, and in this case, the threshold c has to be decreased to ensure that the authentication succeeds, which will multiply the security risk of the protocol. As for machine learning attacks on arbiter Physical Unclonable Functions (A Physical Unclonable Functions), when the prediction rate of the attacks is decreased from 98% to 95%, the number of required CRPs will be decreased by over ten times, that is, attackers can simulate the interaction between equipment and a server just by collecting one-tenth of CRPs. When the server is violently attacked, if 100 groups of challenges are used for authentication, the number of required attacks will be decreased from $2.51 \times 10^{26}$ to $1.597 \times 10^{22}$ with the decrease of the threshold from 98% to 95%, that is, by the number of required attacks is decreased by 15,000, which seriously threatens the security of the authentication protocol of strong Physical Unclonable Functions.

At present, in order to improve the stability of strong Physical Unclonable Functions and eliminate the influence of unstable bits on the overall structure, researchers have proposed many solutions, the common ones of which are error-correcting code (ECC), temporal majority voting (TMV) and automatic self-checking and healing (ASCH). All these techniques are proposed for weak Physical Unclonable Functions, which generate information by means of one Physical Unclonable Function module. Different from weak Physical Unclonable Functions, unstable modules of which can be shielded or deleted, strong Physical Unclonable Functions generate information by means of multiple Physical Unclonable Function modules, so the stability of the strong Physical Unclonable Function is determined by multiple modules, and thus cannot be improved by changing specific modules, which makes these techniques not suitable for strong Physical Unclonable Functions. Some researchers have proposed a solution to improving the stability of strong Physical Unclonable Functions by adding an error correcting circuit. Although this solution can improve the stability of strong Physical Unclonable Functions, it is accompanied by large area expenditure, thus not being suitable for the application of IoT nodes.

BRIEF SUMMARY OF THE INVENTION

The technical issue to be settled by the invention is to provide a challenge screening method for improving the stability of a strong Physical Unclonable Function, which can greatly improve the stability of the strong Physical Unclonable Function to be close to a desired value 100%, makes the strong Physical Unclonable Function be barely influenced by external disturbance, and will not increase the area expenditure.

The technical solution adopted by the invention to settle the above technical issues is as follows: a challenge screening method for improving the stability of a strong Physical Unclonable Function comprises the following steps:

Step 1: randomly generating n groups of challenges for testing the stability of a strong Physical Unclonable Function, n being an integer greater than or equal to 100,000; repeatedly inputting each of the n groups of challenges to the strong Physical Unclonable Function m times to obtain m responses corresponding to each group of challenges, m being an integer greater than or equal to 100; if the m responses corresponding to one of the n groups of challenges are identical, determining this group of challenges as stable challenges, and denoting the stability of the corresponding responses as 1; otherwise, determining this group of challenges as unstable challenges, and denoting the stability of the corresponding responses as 0, thus obtaining the stability of the responses corresponding to each of the n groups of challenges;

Step 2: defining one group of challenges and the stability of responses corresponding to this group of challenges as a challenge-stability pair (CSP); forming one CSP by each of the n groups of challenges and the stability of the corresponding responses, such that n CSPs are obtained, and forming a machine learning training dataset by the n CSPs;

Step 3: obtaining a machining learning model, and adjusting the number of to-be-solved parameters of the machine learning model to be identical with the number of bits of each group of challenges of the strong Physical Unclonable Function, such that each to-be-solved parameter corresponds to one challenge in each group; with the group of challenges in each CSP as an input of the machine learning model and the stability of the responses corresponding to this group of challenges as an output of the machine learning model, training the machine learning model with the n CSPs until the machine learning model is converged, and using the trained machine learning model as a screening model, wherein during the training process of the machine learning model, minimum search is performed on a loss function of the machine learning model through an optimization algorithm, and when the loss function is minimum, it indicates that the machine learning model is converged;

Step 4: during the actual application of the strong Physical Unclonable Function, screening stable challenges by means of the screening model, which specifically comprises:

S1: randomly generating multiple groups of challenges of the strong Physical Unclonable Function, forming an initial challenge set by the multiple groups of challenges, and randomly sorting the multiple groups of challenges in the initial challenge set;

S2: sequentially inputting the multiple groups of challenges in the initial challenge set to the screening model in order, and using an output generated by the screening model when each group of challenges is input as the stability of responses corresponding to this group of challenges, wherein if the output of the screening model is 1, it indicates that the group of challenges input to the screening model are stable challenges; if the output of the screening model is 0, it indicates that the group of challenges input to the screening model are unstable challenges; if the number of obtained stable challenge meets actual application requirements before the multiple groups of challenges in the initial challenge set are not all input to the screening model or after the multiple groups of challenges in the initial challenge set are all input to the screening model, stopping inputting; if the number of obtained stable challenges still does not meet the actual application requirements after the multiple groups of challenges in the initial challenge set are all input to the screening model, returning to S1 until the number of obtained stable challenges meets the actual application requirements; and Step 5: forming a stable challenge set by all the stable challenges determined in S4, and inputting the stable challenge set to the strong Physical Unclonable Function to extract identity information.

The machine learning model is any one of a support vector machines (SVM) model, an artificial neural network (ANN) model, a convolutional neural network (CNN) model and a LightGBM model.

The optimization algorithm is any one of a gradient descent algorithm, a Newton algorithm and a swarm intelligence algorithm.

BRIEF DESCRIPTION OF THE SEVERAL VIEWS OF DRAWINGS

FIG. 4($b$) is a distribution diagram of responses corresponding to a stable challenge set obtained after the initial challenge set is screened by the challenge screening method for improving the stability of a strong Physical Unclonable Function according to the invention;

FIG. 5($b$) is a distribution diagram of autocorrelation factors of 100,000 responses corresponding to the stable challenge set obtained after screening by the initial challenge set screened by the challenge screening method for improving the stability of a strong Physical Unclonable Function according to the invention.

DETAILED DESCRIPTION OF THE INVENTION

The invention will be described in further detail below in conjunction with accompanying drawings and embodiments.

Figure 2:
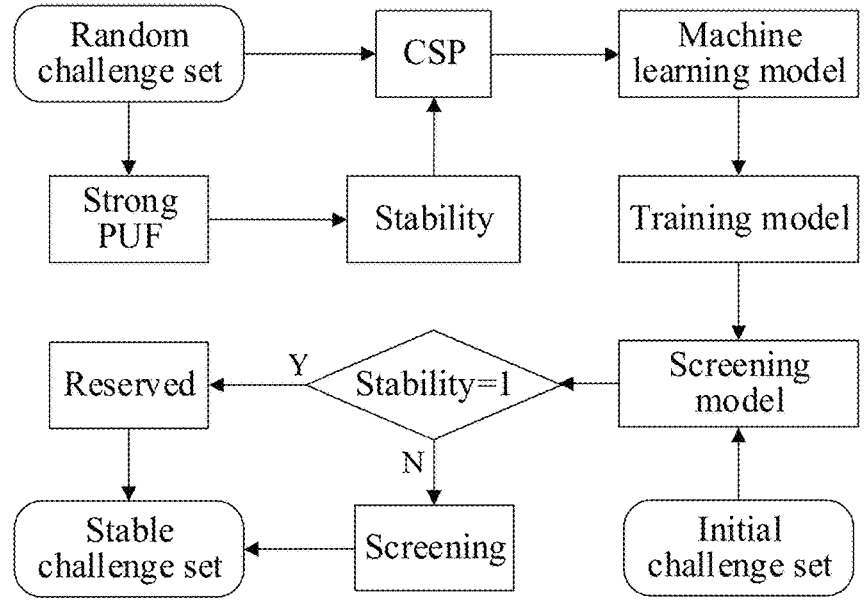
FIG. 2 is a flow diagram of a challenge screening method for improving the stability of a strong Physical Unclonable Function according to the invention.

Embodiment: As shown in FIG. 2, a challenge screening method for improving the stability of a strong Physical Unclonable Function comprises the following steps:

Step 1: randomly generating n groups of challenges for testing the stability of a strong Physical Unclonable Function, n being an integer greater than or equal to 100,000; repeatedly inputting each of the n groups of challenges to the strong Physical Unclonable Function m times to obtain m responses corresponding to each group of challenges, m being an integer greater than or equal to 100; if the m responses corresponding to one of the n groups of challenges are identical, determining this group of challenges as stable challenges, and denoting the stability of the corresponding responses as 1; otherwise, determining this group of challenges as unstable challenges, and denoting the stability of the corresponding responses as 0, thus obtaining the stability of the responses corresponding to each of the n groups of challenges;

Step 2: defining one group of challenges and the stability of responses corresponding to this group of challenges as a challenge-stability pair (CSP); forming one CSP by each of the n groups of challenges and the stability of the corresponding responses, such that n CSPs are obtained, and forming a machine learning training dataset by the n CSPs;

Step 3: obtaining a machining learning model, and adjusting the number of to-be-solved parameters of the machine learning model to be identical with the number of bits of each group of challenges of the strong Physical Unclonable Function, such that each to-be-solved parameter corresponds to one challenge in each group; with the group of challenges in each CSP as an input of the machine learning model and the stability of the responses corresponding to this group of challenges as an output of the machine learning model, training the machine learning model with the n CSPs until the machine learning model is converged, and using the trained machine learning model as a screening model, wherein during the training process of the machine learning model, minimum search is performed on a loss function of the machine learning model through an optimization algorithm, and when the loss function is minimum, it indicates that the machine learning model is converged;

Step 4: during the actual application of the strong Physical Unclonable Function, screening stable challenges by means of the screening model, which specifically comprises:

S1: randomly generating multiple groups of challenges of the strong Physical Unclonable Function, forming an initial challenge set by the multiple groups of challenges, and randomly sorting the multiple groups of challenges in the initial challenge set;

S2: sequentially inputting the multiple groups of challenges in the initial challenge set to the screening model in order, and using an output generated by the screening model when each group of challenges is input as the stability of responses corresponding to this group of challenges, wherein if the output of the screening model is 1, it indicates that the group of challenges input to the screening model are stable challenges; if the output of the screening model is 0, it indicates that the group of challenges input to the screening model are unstable challenges; if the number of obtained stable challenge meets actual application requirements before the multiple groups of challenges in the initial challenge set are not all input to the screening model or after the multiple groups of challenges in the initial challenge set are all input to the screening model, stopping inputting; if the number of obtained stable challenges still does not meet the actual application requirements after the multiple groups of challenges in the initial challenge set are all input to the screening model, returning to S1 until the number of obtained stable challenges meets the actual application requirements; and Step 5: forming a stable challenge set by all the stable challenges determined in S4, and inputting the stable challenge set to the strong Physical Unclonable Function to extract identity information.

In this embodiment, the machine learning model is any one of a support vector machines (SVM) model, an artificial neural network (ANN) model, a convolutional neural network (CNN) model and a LightGBM model.

In this embodiment, the optimization algorithm is any one of a gradient descent algorithm, a Newton algorithm and a swarm intelligence algorithm.

Figure 3:
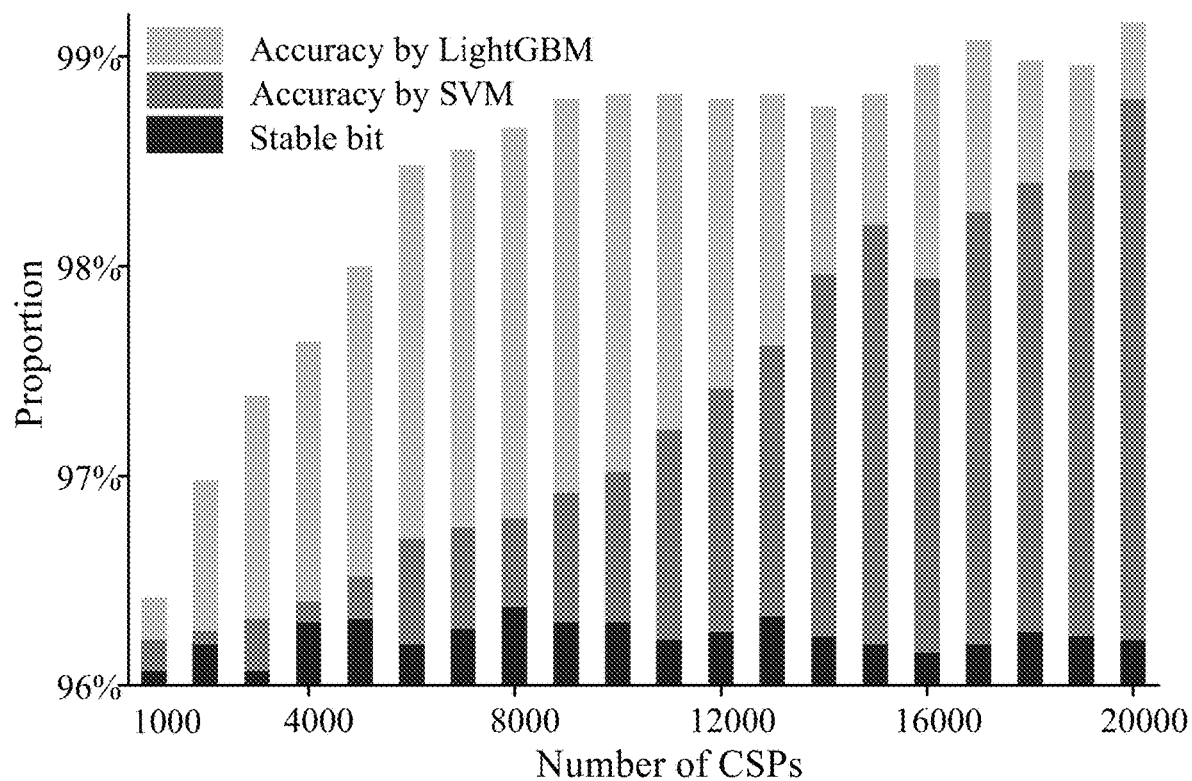
FIG. 3 is a comparison chart of the modeling accuracy of screening models of the challenge screening method for improving the stability of a strong Physical Unclonable Function according to the invention.

To verify the validity of machine learning to the construction of the screening model for modeling the corresponding relationship of CSPs, 25,000 groups of CSPs of a 6XOR-APhysical Unclonable Function are collected to test the accuracy of the LightGBM model and the SVM model under the condition of training datasets comprising different numbers of CSPs, and test results are shown in FIG. 3. As can be known from FIG. 3 that, when the number of CSPs in the training dataset reaches 20,000, the modeling accuracy of the LightGBM model and the modeling accuracy of the SVM model are both close to the desired value 100%, indicating that machine learning is suitable for modeling the corresponding relationship of CSPs. Compared with the SVM model, the LightGBM model has higher modeling accuracy and requires fewer CSPs when applied to the method provided by the invention to construct the screen model, thus being preferred by the invention.

Figure 1:
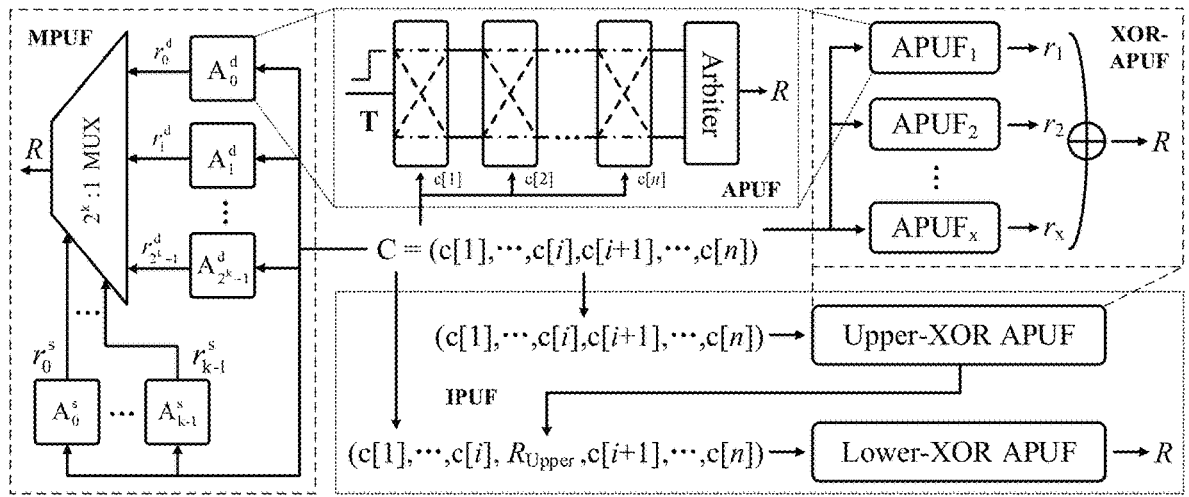
FIG. 1 is a structural diagram of several existing strong Physical Unclonable Functions based on APUFs.

The stability is defined as the proportion of stable bits in all responses, and the accuracy of the stability, as a statistic, is greatly influenced by the change of the number of samples, and more accurate stability will be obtained with the increase of the size of challenge data used for testing the stability. When the statistic is over 4,000, the stability changes slightly, indicating that the statistic should be greater than 4,000 when the stability of the strong Physical Unclonable Function is tested. The noise factor represents the intensity of external disturbance withstood by the strong Physical Unclonable Function. With the increase of the noise factor, signals will be more unstable during the transmission process, and the stability of the strong Physical Unclonable Function will be worse. In this embodiment, in the phase of screen model construction, 1,000,000 groups of CSPs are collected to train the machine learning model which is the LightGBM model, and 100,000 iterations are performed for optimization. The data size of the initial challenge set used for screening is 100,000 to ensure that there are sufficient challenges for testing the stability of the strong Physical Unclonable Function after screening. FIG. 1 illustrates the structural diagram of several strong Physical Unclonable Functions based on APUFs, the APUF, 3XOR-APUF and 4-MPUF in FIG. 1 are used for testing the method provided by the invention, and test results are shown in Table 1.

TABLE 1

| PUF type | Noise factor | Dataset | 32bit | 64bit |
|---|---|---|---|---|
| APUF | 0.05 | Random | 91.06% | 90.35% |
| | | After screening | 96.21% | 92.03% |
| | 0.1 | Random | 77.67% | 82.01% |
| | | After screening | 98.52% | 92.73% |
| | 0.2 | Random | 58.53% | 59.16% |
| | | After screening | 95.80% | 95.75% |
| 3XOR-APUF | 0.05 | Random | 71.44% | 74.72% |
| | | After screening | 81.10% | 79.78% |
| | 0.1 | Random | 46.35% | 47.33% |
| | | After screening | 92.84% | 79.89% |
| | 0.2 | Random | 38.75% | 35.77% |
| | | After screening | 95.70% | 83.71% |
| 4-MPUF | 0.05 | Random | 82.58% | 80.06% |
| | | After screening | 83.68% | 81.11% |
| | 0.1 | Random | 63.76% | 62.11% |
| | | After screening | 86.45% | 83.41% |
| | 0.2 | Random | 35.71% | 37.85% |
| | | After screening | 70.80% | 68.76% |

In Table 1, "random" represents data corresponding to an initial challenge set before screening, and "after screening" represents data corresponding to a stable challenge set obtained after the initial challenge set is screened through the method provided by the invention. It can be known, by analyzing Table 1, that when the noise factors of the three strong PUFs are 0.2, 0.125 and 0.1 respectively, the stability of the APUF is improved from 57.143% to 95.752% after screening, the stability of the 3XOR-APUF is improved from 46.264% to 78.263% after screening, and the stability of the 4-MPUF is improved from 61.708% to 67.528% after screening. After the initial random challenge set is screened through the method provided by the invention, the stability of these three strong Physical Unclonable Functions is remarkably improved, and the method has a better improvement effect on Physical Unclonable Functions with lower stability. Because machine learning is in inverse proportional to the challenge-stability modeling accuracy and the complexity of the function, the stability after screening is related to the complexity of the strong Physical Unclonable Function. By comparing the prediction rates after screening of different strong Physical Unclonable Functions, it can be seen that the simpler the structure of Physical Unclonable Functions, the higher the stability after screening. Compared with the other two Physical Unclonable Functions, the APUF has the simplest structure, so the final stability of the APUF is best. In addition, compared with 64 bit strong Physical Unclonable Functions, 32 bit strong Physical Unclonable Functions are easier to model, thus having better stability after screening. When the initial stability is poor, the machine learning model will have a better effect, and the stability after screening is even better than that of Physical Unclonable Functions with high initial stability, which is related to the modeling principle of machine learning. When the output data is excessively biased to 0 or 1, the loss function of the machine learning model is prone to a local optimum, thus losing the optimization effect. When the stability is high, the S value for evaluating the stability is 1, so the modeling accuracy cannot be further improved, and the improvement effect cannot be realized.

Figure 4A:
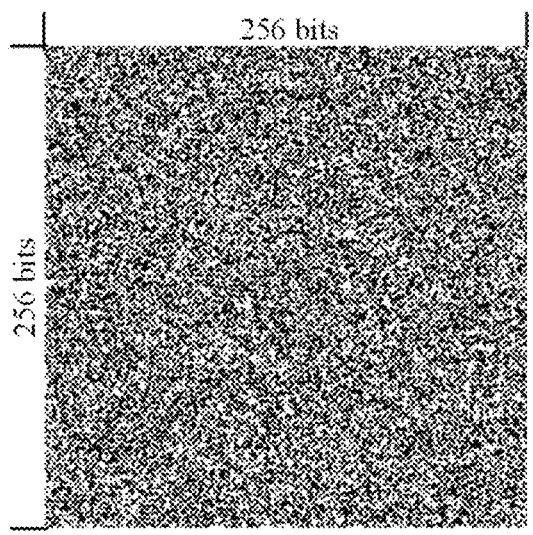
FIG. 4($a$) is a distribution diagram of responses corresponding to an initial challenge set screened by the challenge screening method for improving the stability of a strong Physical Unclonable Function according to the invention.
Figure 4B:
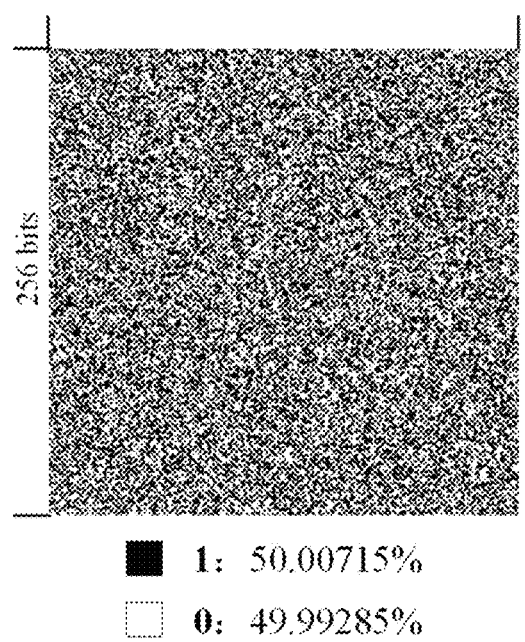

FIG. 4(a) illustrates a distribution diagram of responses corresponding to an initial challenge set screened by the challenge screening method for improving the stability of a strong Physical Unclonable Function according to the invention, and FIG. 4(b) illustrates a distribution diagram of responses corresponding to a stable challenge set obtained after screening by the challenge screening method for improving the stability of a strong Physical Unclonable Function according to the invention. In FIG. 4(a) and FIG. 4(b), the black pixel indicates that a response is 1, and the white pixel indicates that a response is 1. Because the binary information source contains the maximum amount of information when the information entropy of the binary information source is 50%, the output performance of the strong Physical Unclonable Function will be improved with the increase of the randomness of the 0/1 distribution of the response set. It can be known by analyzing FIG. 4(a) and FIG. 4(b) that the screened challenges have no influence on the randomness of the strong Physical Unclonable Function, the proportion of 0/1 in the response set is extremely close to 50%, and the black pixels and the white pixels are uniformly distributed, indicating that the randomness is good.

Figure 5A:
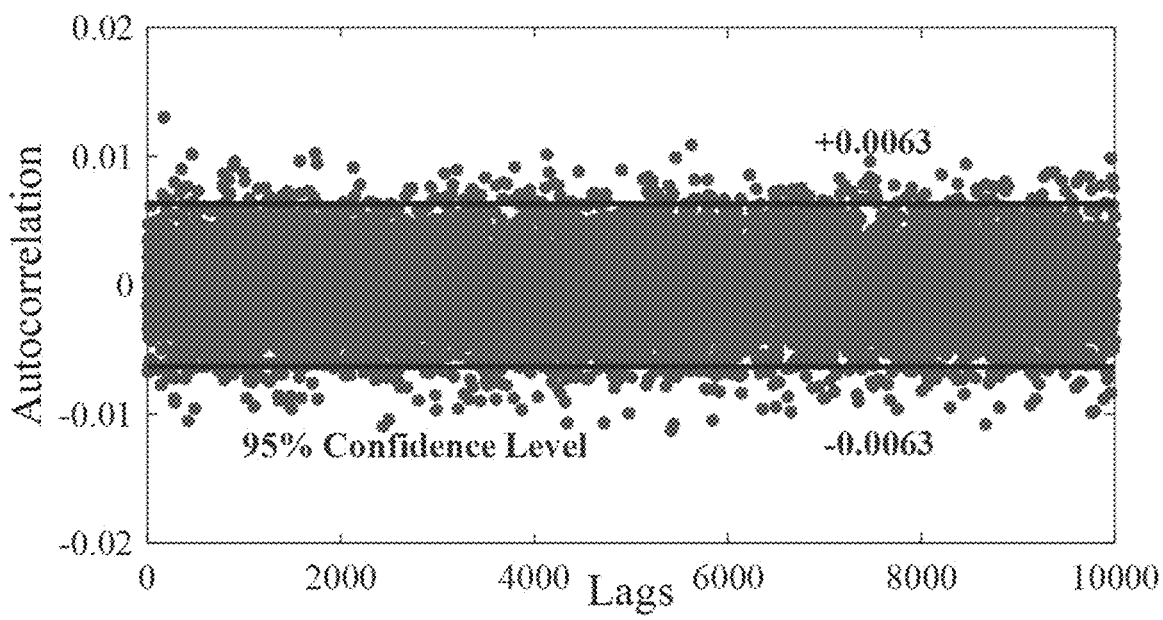
FIG. 5($a$) is a distribution diagram of autocorrelation factors of 100,000 responses corresponding to the initial challenge set screened by the challenge screening method for improving the stability of a strong Physical Unclonable Function according to the invention.
Figure 5B:
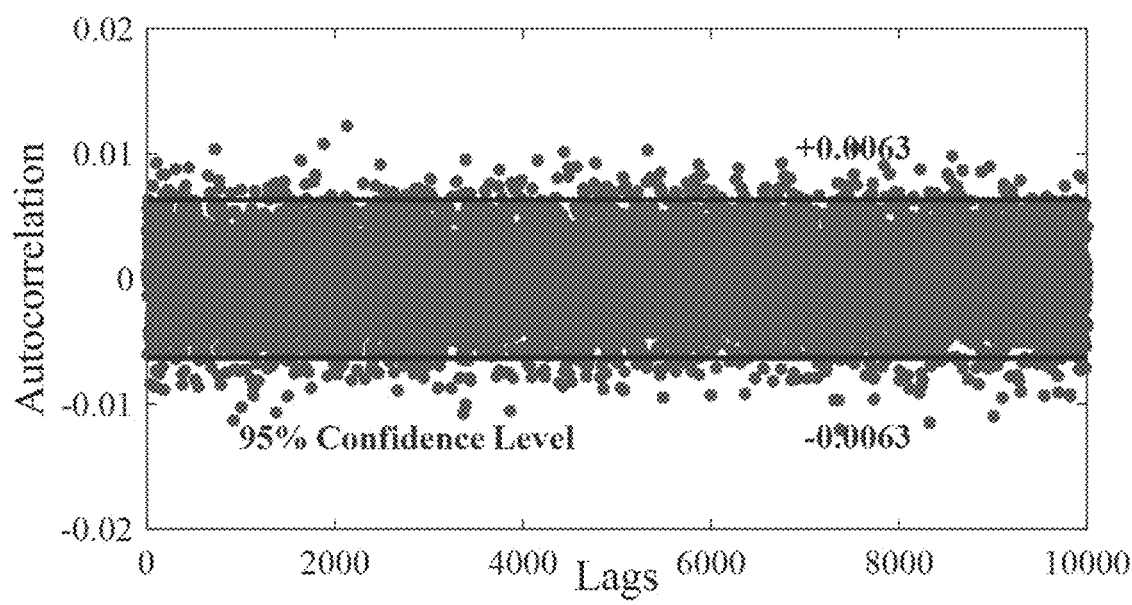

FIG. 5(a) illustrates a distribution diagram of autocorrelation factors of 100,000 responses corresponding to the initial challenge set screened by the challenge screening method for improving the stability of a strong Physical Unclonable Function according to the invention, and FIG. 5(b) illustrates a distribution diagram of autocorrelation factors of 100,000 responses corresponding to the stable challenge set obtained after screening by the initial challenge set screened by the challenge screening method for improving the stability of a strong Physical Unclonable Function according to the invention. In FIG. 5(a) and FIG. 5(b), the horizontal axis indicates the shift of responses, and the vertical axis indicates the autocorrelation factor of the current response. The autocorrelation factor represents the change of the autocorrelation between any two values of signals with the variation of the interval, and is used for testing the uniqueness. A group of responses can be regarded as a discrete signal, and the higher the uniqueness of responses, the weaker the correlation, and the smaller the autocorrelation function value. The correlation between 100,000 random challenges and responses generated by screened challenges is calculated, and it can be known from FIG. 5(a) and FIG. 5(b) that the method provided by the invention barely has an influence on the uniqueness of the responses of the strong Physical Unclonable Function, and within the confidence interval of 95%, the ACF is 0.0063, which is extremely close to the desired value 0.

In view of this, it is of great significance to design a challenge screening method for improving the stability of strong Physical Unclonable Functions, which can improve the stability of strong Physical Unclonable Functions without increasing the area expenditure.

Compared with the prior art, the invention has the following advantages: the stability of each group of challenges is quantized by 1 or 0; if the stability of the group of challenges is 1, the group of challenges are defined as stable challenges; if the stability of the group of challenges is 0, the group of challenges are defined as unstable challenges; the group of challenges and the stability of corresponding responses are defined as a challenge-stability pair (CSP); then, a machining learning training dataset is constructed by means of CSPs to train a machining learning model to obtain a screening model, to associate the challenge stability with the screening model; during actual application of the strong Physical Unclonable Function, the challenge stability of a strong Physical Unclonable Function can be determined through the screening model, and then stable challenges of the strong Physical Unclonable Function are screened out to form a stable challenge set, which is input to the strong Physical Unclonable Function to extract identity information; in the invention, the relation between challenges and the stability of corresponding responses is modeled through a machine learning method, the stability of any challenges is calculated through the screening model, and challenges in a random challenge set can be screened to discard unstable challenges and reserve stable challenges before the random challenge set is input to the strong Physical Unclonable Function, that is, the stable challenges are determined before the strong Physical Unclonable Function is tested, such that the stability of the strong Physical Unclonable Function can be greatly improved to be close to the desired value 100% without adding an error correcting circuit to the strong Physical Unclonable Function, and the risk of information leakage is avoided; and because of the apodeictic functional relationship between inputs and outputs of the strong Physical Unclonable Function, the challenge screening method is suitable for any strong PUFs, thus being high in universality. Thus, the challenge screening method can greatly improve the stability of the strong Physical Unclonable Function to be close to the desired value 100%, the strong Physical Unclonable Function will be barely influenced by external disturbance, and the area expenditure will not be increased; and test results indicate that the challenge screening method provided by the invention can effectively improve the stability of various strong Physical Unclonable Functions and has a better effect with the increase of external disturbance.

To sum up, the challenge screening method for improving the stability of a strong Physical Unclonable Function provided by the invention can improve the stability of responses. According to the method, machine learning is used to model the relation between challenges and the stability of corresponding responses, and the stability of any challenges is calculated through a screen model. When an unknown challenge set is input to the strong Physical Unclonable Function, unstable challenges can be discarded, and the stability of a stable challenge set obtained after screening is greatly improved. It can be seen from the test results that the challenge screening method for improving the stability of a strong Physical Unclonable Function can effectively improve the stability of various strong PUFs based on APUFs, and has a better effect with the increase of external disturbance. Compared with the traditional error correcting algorithm, the risk of information leakage is avoided because the stability of specific challenges has been determined through the method provided by the invention before tests. The results prove that the method can be widely used to improve the stability of strong PUFs and provides an effective solution to disturbance resistance for IoT equipment authentication.

What is claimed is:

1. A challenge screening method for improving the stability of a strong Physical Unclonable Function, comprises:

Step 1: randomly generating n groups of challenges for testing the stability of a strong Physical Unclonable Function, n being an integer greater than or equal to 100,000; repeatedly inputting each of the n groups of challenges to the strong Physical Unclonable Function m times to obtain m responses corresponding to each group of challenges, m being an integer greater than or equal to 100; if the m responses corresponding to one of the n groups of challenges are identical, determining a first group of challenges as stable challenges, and denoting the stability of the corresponding responses as 1; otherwise, determining the first group of challenges as unstable challenges, and denoting the stability of the corresponding responses as 0, thus obtaining the stability of the responses corresponding to each of the n groups of challenges;

Step 2: defining a second group of challenges and the stability of responses corresponding to the first group of challenges as a challenge-stability pair (CSP); forming one CSP by each of the n groups of challenges and the stability of the corresponding responses, such that n CSPs are obtained, and forming a machine learning training dataset by the n CSPs;

Step 3: obtaining a machining learning model, and adjusting a number of to-be-solved parameters of a machine learning model to be identical with a number of bits of each group of challenges of the strong Physical Unclonable Function, such that each to-be-solved parameter corresponds to one challenge in each group; with the group of challenges in each CSP as an input of the machine learning model and the stability of the responses corresponding to the group of challenges as an output of the machine learning model, training the machine learning model with the n CSPs until the machine learning model is converged, and using the trained machine learning model as a screening model, wherein during a training process of the machine learning model, minimum search is performed on a loss function of the machine learning model through an optimization algorithm, and when the loss function is minimum, it indicates that the machine learning model is converged;

Step 4: during the actual application of the strong Physical Unclonable Function, screening stable challenges by means of the screening model, which specifically comprises:

S1: randomly generating multiple groups of challenges of the strong Physical Unclonable Function, forming an initial challenge set by the multiple groups of challenges, and randomly sorting the multiple groups of challenges in the initial challenge set;

S2: sequentially inputting the multiple groups of challenges in the initial challenge set to the screening model in order, and using an output generated by the screening model when each group of challenges is input as the stability of responses corresponding to this group of challenges, wherein if the output of the screening model is 1, it indicates that the group of challenges input to the screening model are stable challenges; if the output of the screening model is 0, it indicates that the group of challenges input to the screening model are unstable challenges; if a number of obtained stable challenge meets actual application requirements before the multiple groups of challenges in the initial challenge set are not all input to the screening model or after the multiple groups of challenges in the initial challenge set are all input to the screening model, stopping inputting; if the number of obtained stable challenges still does not meet the actual application requirements after the multiple groups of challenges in the initial challenge set are all input to the screening model, returning to S1 until the number of obtained stable challenges meets the actual application requirements; and Step 5: forming a stable challenge set by all the stable challenges determined in S4, and inputting the stable challenge set to the strong Physical Unclonable Function to extract identity information.

2. The challenge screening method for improving the stability of a strong Physical Unclonable Function, according to claim 1, wherein the machine learning model is any one of a support vector machines (SVM) model, an artificial neural network (ANN) model, a convolutional neural network (CNN) model and a LightGBM model.

3. The challenge screening method for improving the stability of a strong Physical Unclonable Function, according to claim 1, wherein the optimization algorithm is any one of a gradient descent algorithm, a Newton algorithm and a swarm intelligence algorithm.

* * * * *